United States Patent Office 2,966,190
Patented Dec. 27, 1960

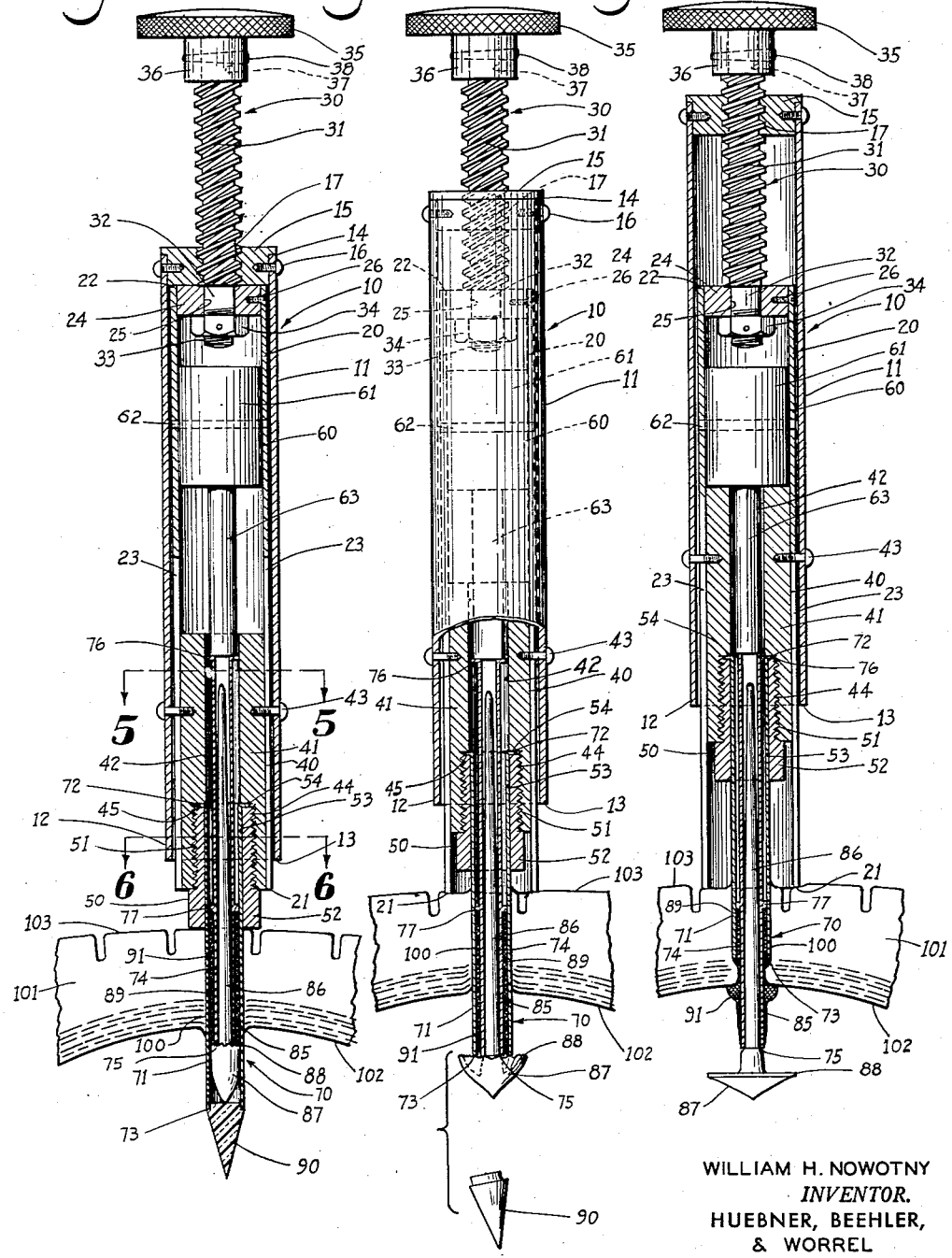

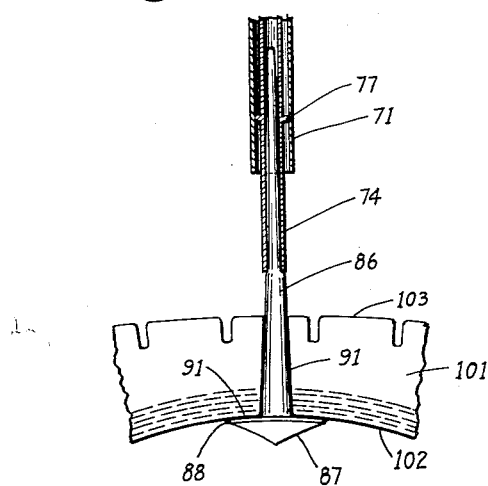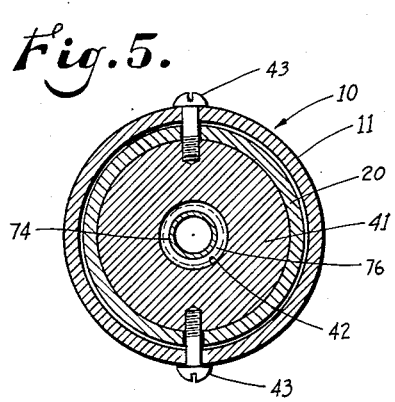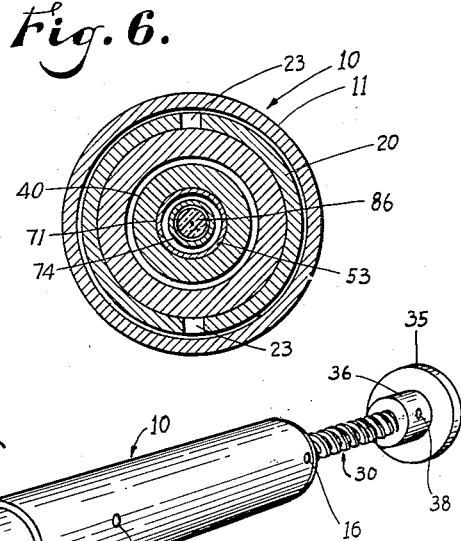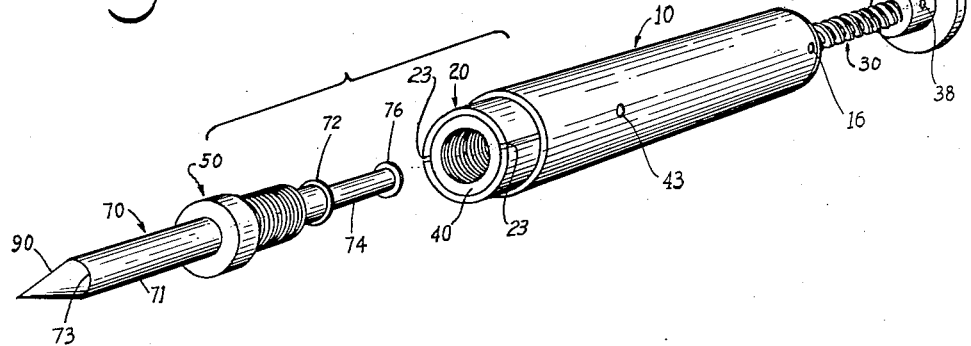

2,966,190

CARTRIDGE PLUG TIRE PATCHING APPARATUS

William H. Nowotny, Fresno, Calif., assignor to Central California Engineering Corp., Fresno, Calif., a corporation of California Filed May 7, 1957, Ser. No. 657,640

6 Claims. (Cl. 152—370)

The present invention relates to a patching apparatus and more particularly to an apparatus for inserting a plug and a bonding agent therefor into a hole in a workpiece such as a tubeless tire.

A well-known method of repairing a puncture in the inner tube of a tire is to vulcanize a patch to the tube over the puncture. With the advent of tubeless tires, this method of repair is no longer practical. The patch cannot effectively be applied on the outside of the tire and to apply it on the inside requires deflation of the tire and removal from the rim. Because of the necessity of maintaining an air-tight seal between the tubeless tire and the rim, the task of tire removal is tedious and time consuming. Even if removed, interior vulcanization of many tubeless tires is still impractical. This is because the vulcanization of a patch is normally preceded by roughening the surface to which the patch is to be attached, as by scraping. Many tubeless tires have inner liners of rubber which is too soft to permit effective scraping and is damaged thereby.

Accordingly, elongated plugs have been devised for insertion into a puncture or hole to fill it up and to prevent air leakage. Usually provision is made for concurrent cement injection to bond the plug to the tire. One such device presently in use provides a rubber mushroom-shaped plug having a stem partially fitted in an elongated cylindrical tube and a head and part of the stem outside of the tube. The device also provides a cylinder of a liquid bonding agent having an outlet and a piston for forcing the liquid through the outlet. Finally, a gun is employed which holds the cylinder and the tube in axially aligned relation to force the bonding agent into the tube and thence out of apertures in the tube around the plug upon squeezing of a trigger. In use, the three elements are assembled, the tire is lubricated around the puncture, and the head of the plug placed against the tire over the puncture. Then an attempt is made to force the plug manually through the hole and to squeeze the trigger to inject the bonding agent, as described. Although generally serving to plug the hole, such prior art devices have been difficult and time consuming to insert and untidy and cumbersome to handle. The flexible plug is not conducive to ready axial sliding into the hole. If the hole is not at the surface but down between the treads, it is almost impossible to lubricate and thereafter to insert the plug. The release of the bonding agent is so insufficiently controlled that more of it frequently is applied to the exterior of the tire, to the gun, and to the hands of the operator than within the hole and around the plug. The apertures in the tube are not properly located to enable application of the bonding agent to the head of the plug. Still further, it has been difficult to patch the hole with air in the tire since the air pressure works against insertion of the plug and the bonding agent.

These and other inadequacies in the prior art have given rise to the developments of the subject invention.

Accordingly, it is an object of the present invention to provide an improved patching apparatus for tires and the like.

Another object is to repair leakage holes in workpieces such as tubeless tires.

Another object is to provide an apparatus for inserting a plug and a bonding agent therefor into a hole in a workpiece.

Another object is to repair punctures in tubeless tires without their removal from their rims and even while inflated, if desired.

Another object is to minimize the time and effort required to repair a tubeless tire.

Another object is to provide a patching apparatus of the character described which is easy to handle.

Another object is to provide an apparatus for inserting a flexible plug in a hole of a workpiece which prevents flexing of the plug as it is inserted into the hole.

Another object is to provide an apparatus for controlled release of a bonding agent within a hole of a workpiece and for thorough application around a plug inserted therewithin.

Another object is to provide a cartridge for holding a resiliently flexible and compressible plug and a bonding agent therefor which is adapted to facilitate controlled insertion of the plug and injection of the bonding agent into the hole.

Another object is to provide a tool attachable to a cartridge as described in the preceding paragraph which is adapted to remove the cartridge from the hole and the plug, and to effect injection of the bonding agent during such removal.

Another object is to provide an apparatus as described which is adapted to repair various sizes of holes.

Other objects are to provide such a patching apparatus which is economical to make and use, dependable in action, and durable in construction.

These together with other objects will become more fully apparent upon reference to the following description.

In the drawings:

Fig. 1 is a longitudinal section of portions of a patching apparatus constructed in accordance with the principles of the present invention with other portions in side elevation. The apparatus is shown in assembled condition immediately after being inserted in a tire, a portion of which is illustrated.

Fig. 2 is a view similar to Fig. 1 but with more of the apparatus in side elevation and in a successive stage of operation.

Fig. 3 is a view similar to Fig. 1 but with the apparatus in a further advanced stage of operation than in Fig. 2.

Fig. 4 is a fragmentary longitudinal section of the end of the cartridge and the plug and a fragmentary view of a tire with the plug and cartridge in a still further advanced stage of operation than in Fig. 3.

Fig. 5 is a transverse section taken on a plane at a position represented by line 5—5 in Fig. 1.

Fig. 6 is a transverse section taken on a plane at a position represented by line 6—6 in Fig. 1.

Fig. 7 is a perspective view of the apparatus in partially disassembled condition.

Referring more particularly to the drawing, an injecting tool particularly adapted for repairing holes in punctured workpieces such as tires is indicated by the numeral 10. The tool provides an elongated substantially cylindrical outer housing 11 having a forward open end 12 providing an annular end face 13, and a rearward end 14. The expressions "forward" and "rearward" are employed only for descriptive convenience and are not intended to limit the position of use of the tool. An end wall 15 is fitted in the rearward end of the housing and is secured therein by a plurality of metal screws 16. The end wall provides a threaded bore 17 concentric to the housing.

The tool 10 also includes an inner, substantially cylindrical sleeve 20 mounted within the housing 11 for longitudinal slidable movement in and out of the forward open end 12 of the housing. The sleeve has an open forward end 21, a rearward end 22, and a pair of diametrically opposed, elongated slots 23 opening at the forward end. A bushing 24 is fitted in the rearward end of the sleeve and provides an internally smooth bore 25 concentric to the sleeve and thus coaxial with the threaded bore 17. Metal screws 26 are extended through the sleeve and into the bushing for securing the latter in the sleeve.

An elongated manipulating shank 30 includes a threaded portion 31 screw-threaded in the bore 17 of the end wall 15, a smooth portion 32 rotatably received in the smooth bore 25 of the bushing 24, and a threaded end 33 within the sleeve 20. A nut 34 is screw-threaded on the end 33 of the shank. A knurled knob 35 provides an axial boss 36 having a bore 37 fitted over the shank and secured thereto by means of a setscrew 38. It is thus evident that threading of the shank inwardly and outwardly of the housing 11 slides the sleeve outwardly and inwardly of the housing.

A mounting member 40 is slidably fitted within the forward end 21 of the sleeve 20 and includes a mounting block 41 providing an elongated axial bore 42 concentric to the sleeve. Setscrews 43 are transversely extended through the housing 11 through the slots 23, and into the mounting block for rigidly connecting the block to the housing. The mounting block has an endwardly opening internally threaded female socket 44 of larger diameter than the bore 42 and providing an inner annular seat 45. It is to be noted that the socket is located adjacent to the forward end 21 of the housing.

The mounting member 40 also includes a releasable holder 50 having a threaded male portion 51 releasably screw-threadably fitted in the socket 44 of the block, and a head 52 tightened against the end of the block when the male portion is completely within the socket. The holder has an elongated axial bore 53 axially aligned with the bore 42 in the block and of substantially the same diameter as the bore 42. In effect, therefore, the bores 42 and 53 constitute an elongated axial bore in the mounting member. The male portion provides an inner annular face 54 in opposed parallel relation to the seat 45.

The tool 10 also includes a plunger 60 having a substantially cylindrical mounting portion 61 fitted within the rearward end 22 of the sleeve 20 and secured therewithin by means of a pin 62 extended transversely through the sleeve and said mounting portion. The plunger includes an elongated rod 63 axially extended from the mounting portion forwardly within the sleeve in axial alignment with the bore 42 in the mounting block 41. The rod moves longitudinally within the bore 42 incident to relative telescopic movement of the sleeve and the housing 11.

The subject invention also provides a cartridge 70, best seen externally by reference to Fig. 7 and in cross section in the other figures. The cartridge includes an outer elongated substantially cylindrical, rigid tube 71 providing a rear outwardly extended annular flange 72, and a forward open end 73. An elongated substantially cylindrical, rigid inner tube 74 is concentrically extended within the outer tube providing a forward open end 75 terminating short of the forward edge of the outer tube and a rear outwardly extended annular flange 76. The inner tube is approximately one and one-half times as long as the outer tube but is of lesser outside diameter than the inside diameter of the outer tube so as to be in peripherally spaced relation to the outer tube. An annular piston 77 is circumscribingly integrally secured to the inner tube within the outer tube and is outwardly extended into slidable substantially liquid-tight engagement with the outer tube.

A mushroom-shaped plug or patching member 85 of resiliently flexible and compressible material, preferably rubber, provides an elongated generally conical stem 86 and a conical head 87 convergent endwardly away from the stem. The stem of the patching member is convergently tapered from the head, is extended within the inner tube 74, and is substantially coextensive therewith so as to position the head at the forward ends 73 and 75 of the tubes. The stem is of slightly greater mean diameter than the inside diameter of the inner tube. The head is folded back against the stem and compressibly fitted within the outer tube. In actual production, the plug and tubes are lubricated, the stem is placed in the inner tube, and the head slidably forced through the outer tube from the rearward to the forward end until in the described position. Alternatively, the head may be folded forwardly and thus inserted into the outer tube from its forward end. The position of the head in the outer tube is actually a matter of production convenience. In either position of the head, a substantially fluid-tight chamber 89 is defined between the inner and outer tubes, the head, and the piston 77. A forwardly tapered, conical, plastic, disposable cap 90 is releasably frictionally fitted in the forward end of the outer tube against the head of the plug. A liquid bonding agent or cement 91, such as raw rubber, glue, or the like, is placed in the chamber. A material excellently suited for the purpose is identified as number four rubber cement. In any event the bonding agent is a semi-solid, flowable material at high temperatures or pressures, preferably having a raw rubber base. It is heavy and of relatively high viscosity and hardens at normal temperatures and pressures. Although forming no part of the present invention, it is preferably inserted into the chamber by providing two longitudinally spaced apertures in the outer tube. The bonding agent is injected into the chamber through one aperture under pressure while air escapes through the other aperture. When the chamber is full, the apertures are immediately sealed so that the chamber is substantially airtight. The entire cartridge 70 including the cap 87 are loaded with the plug and the bonding agent is coated with a thin plastic film further to insure air-tightness of the chamber, and compactness and assembly of the parts.

The loaded cartridge 70 is regarded as a unit separate from the tool 10 and is manufactured and sold as such. Thus cartridges of various sizes, including various sizes of plugs, are made available for repairing various sizes of holes. In this connection holders 50 with different sizes of bores 53 may be provided for receiving various sizes of cartridges.

*Operation*

The operation of the described embodiment of the subject invention is believed to be readily apparent and is briefly summarized at this point. The apparatus of the subject invention is designed for repairing, patching, or plugging holes in a workpiece. The device is particularly suited and is best described in connection with the patching of a hole 100 punctured in a tubeless tire 101 which has an inside surface 102 and an outside surface 103.

In order to ready the tool 10 for use, the holder 50 is unthreaded from the mounting block 41. In this regard attention is directed to Fig. 7. A loaded cartridge 70 is then slidably extended through the holder with the rear flange 72 of the outer tube 71 engaging the end face 54 of the holder and the entire cartridge, of course, being concentric with the bore 53. The holder is then rethreaded into the socket 44 until the head 52 engages the mounting block 41. At this point the flange 72 is locked between the seat 45 and the face 54.

It is assumed, of course, that the shank 30 is at its outermost rearwardly extended position with the bushing 24 engaging the end wall 15, as shown in Fig. 1. When the holder 50 containing a loaded cartridge 70 is attached to the tool 10, as above described, the rear flange 76 of the inner tube 74 engages the retracted plunger rod 63. The cartridge 70 is then extended through the hole 100 in the tire 101 until the head 52 of the holder 50 abuts the outer surface 103 of the tire. The tapered cap 90 facilitates movement of the cartridge through the hole. When the head has engaged the tire, the cap as well as that portion of the cartridge in which the head 87 of the plug 85 is located are positioned within the tire adjacent to the inside surface 102. This is the position shown in Fig. 1.

By grasping the knob 35 with one hand and the housing with the other, the shank 30 is rotated to thread the portion 31 inwardly through the end wall 15 into the housing 11. This slides the sleeve 20 forwardly relative to the housing and further out of the open end 12 of the housing. The sleeve moves in this manner until it engages the outer surface 103 of the tire 101. This is best seen by reference to Fig. 2. Concurrently, the plunger rod 63 engaging the inner tube 74, slides the inner tube forwardly relative to the outer tube 71 and relatively inwardly of the tire 101. The forward end 75 of the inner tube forces the head 87 of the plug 85 out of the outer tube 71. The head also forces the cap 90 off from the outer tube. The sleeve engages the tire substantially simultaneously with emergence of the plug head from the outer tube.

Continued rotation of the shank 30, however, causes the housing 11 to move rearwardly away from the tire 101. This is true since the sleeve 20 is prevented from further forward movement by engagement with the tire. Yet, inward threading of the shank compels relative extendible telescoping movement of the housing and the sleeve. As the housing moves rearwardly, it slides the mounting member 40 rearwardly in the sleeve and thus slides the outer tube 71 rearwardly outwardly through the hole 100. The inner tube 74 is held in stationary position since it engages the rod 63 and the rod is precluded from movement because of its connection to the sleeve.

As the outer tube 71 is removed, it slides rearwardly relative to the piston 77, and the bonding agent 91 in the chamber 89 is released between the forward ends 73 and 75 of the tubes for application to the head 87, the inside surface 102, and the walls of the hole 100 of the tire 101. This is illustrated in Fig. 3. The shank 30 is rotated until the plunger mounting portion 61 engages the mounting block 41 whereupon further relative extendible movement of the housing 11 and sleeve 20 is arrested.

The entire tool 10 is then pulled away from the tire 101 whereby the inner tube 74 and the outer tube 71 are slid rearwardly out of the hole 100, as seen in Fig. 4. It is to be noted that at this time the rear flange 76 of the inner tube is in engagement with the rear flange 72 of the outer tube, as seen in Fig. 3. Since the head 87 is spread outwardly, it engages the inside surface 102 of the tire and precludes removal of the plug 85. The tire closes in around the stem 86 as will be evident. Further, the bonding agent 91 flows around the contacting surfaces of the tire and the plug to bond the plug intimately to the tire. The portion of the stem hanging outwardly of the tire is then clipped off to leave a neat, smooth exterior surface.

From the foregoing it will be evident that a hole in a workpiece can be repaired in a minimum of time and with a minimum of effort. The plug is easy to insert and the release of the bonding agent is controlled so that it is thoroughly applied to all contacting surfaces of the plug and the tire. Because of the manner in which the plug is held by the apparatus, a tubeless tire can be repaired while inflated and on the rim. Since the tubes 71 and 74 and the piston 77 in cooperation with the tire provide a seal, air cannot blow the bonding agent out of the hole. In actual use of embodiments of the subject invention it has been found to perform its required tasks in a highly satisfactory manner.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A cartridge adapted for use in repairing a hole in a workpiece comprising inner and outer, circumferentially spaced, slidably interfitted tubes adapted to be extended through such a hole, an annular piston between the tubes and connected to one of the tubes, a resiliently flexible and compressible plug including an elongated stem slidably fitted in the inner tube and a head extended outwardly from the inner tube but being compressibly fitted within the outer tube in longitudinally spaced relation to the piston whereby the tubes, the piston, and the head define an enclosed chamber, and a flowable bonding agent in the chamber whereby relative longitudinal movement of the tubes slides the head in the outer tube and forces the bonding agent out of the chamber for application to the head and the workpiece in the hole and whereby upon sliding the inner tube off from the stem, the bonding agent is applied to the stem.

2. A cartridge adapted for use in repairing a hole in a workpiece comprising inner and outer, radially spaced, slidably interfitted tubes having penetrating ends adapted to extend through such a hole and opposite ends providing longitudinally spaced annular mounting flanges, an annular piston between the tubes and connected to one of the tubes, a resiliently flexible and compressible plug including an elongated stem slidably fitted in the inner tube and a head extended outwardly from the inner tube but being compressibly fitted within the outer tube in longitudinally spaced relation to the piston whereby the tubes, the piston, and the head define an enclosed chamber, a tapered penetrating cap releasably fitted on the penetrating end of the outer tube, and a flowable bonding agent in the chamber whereby relative longitudinal movement of the tubes slides the head out of the outer tube and forces the bonding agent out of the chamber for application to the head and the workpiece in the hole and whereby when the flange of the inner tube engages the flange of the outer tube, the tubes are precluded from further relative sliding in the same direction and thereafter both tubes may be removed from the stem by pulling the outer tube away from the head.

3. In a cartridge for repairing a hole in a workpiece including inner and outer slidably interfitted tubes adapted to be extended through such a hole and having adjacent extended ends, and including a plug having an elongated stem longitudinally slidably extended within the inner tube and a head connected to the stem positioned adjacent to said extended ends of the tubes, the tubes being spaced from each other and providing a cement chamber therebetween extended longitudinally of the tubes and opening outwardly of the tubes between said extended ends, a bonding cement adapted to bond the plug to the workpiece removably positioned in the chamber, and a piston longitudinally slidably positioned in the chamber between the tubes for longitudinal slidable movement in the chamber toward said extended end of the outer tube for ejecting cement endwardly from between said extended ends of the tubes, the inner tube being removable from the stem upon longitudinal slidable movement of the inner tube on the stem relatively away from the head.

4. In a cartridge adapted for use in repairing a hole in a workpiece, inner and outer slidably interfitted tubes adapted to be extended through such a hole and having adjacent extended ends, a plug including an elongated stem longitudinally slidably extended within the inner tube and a head on the stem outside of the inner tube but within the outer tube, the extended end of the inner tube being engageable with the head so as to slide the head of the said extended end of the outer tube incident to relative longitudinal slidable movement of the tubes, said inner tube being removable from the stem upon sliding said inner tube away from the head, the tubes being radially spaced to provide a cement chamber therebetween extended longitudinally of the tubes and opening outwardly of the tubes between said extended ends and adapted to contain a bonding cement, and a piston longitudinally slidably mounted in the chamber between the tubes for longitudinal movement in the chamber toward the extended end of the outer tube for forcing said cement in the chamber outwardly from between the extended ends of the tubes.

5. A cartridge adapted for use in repairing a hole in a workpiece comprising inner and outer, circumferentially spaced, slidably interfitted tubes adapted to be extended through such a hole and having adjacent extended ends, an annular piston circumscribing the inner tube, positioned between the tubes, and longitudinally slidable relative to the outer tube, a resiliently flexible and compressible plug including an elongated stem longitudinally slidably extended in the inner tube and an enlarged head connected to the stem and being compressibly fitted within the outer tube, the tubes providing a chamber therebetween with the piston and the head of the plug constituting opposite end portions of the chamber, said chamber opening exteriorly of the tubes between their adjacent extended ends, and a bonding material in the chamber whereby relative longitudinal movement of the tubes slides the head out of the outer tube and whereby longitudinal movement of the piston in the chamber toward the head forces said bonding material out of the chamber between the extended end of the tubes for application to the head and the workpiece in the hole and whereby upon sliding the inner tube off from the stem, the bonding material is applied to the stem.

6. In a device for plugging a hole in a workpiece, an elongated outer tube, an elongated inner tube extended substantially concentrically within the outer tube and movable longitudinally of the outer tube, an elongated resiliently flexible and compressible patching plug having an elongated stem slidably fitted within the inner tube and an enlarged head extended outwardly of the inner tube and slidably engageable internally of the outer tube, and an annular piston circumscribing and engaging the inner tube in longitudinally spaced relation therealong from the head of the plug and in slidable engagement with the outer tube, the tubes, the piston and the head defining a chamber adapted to receive a bonding cement forceable out of the chamber incident to slidable movement of the piston relative to the outer tube and toward that portion of the outer tube engageable with the head.

References Cited in the file of this patent
UNITED STATES PATENTS

| | | |
|---|---|---|
| 607,379 | Jones | July 12, 1898 |
| 864,226 | Blodgett | Aug. 27, 1907 |
| 1,332,412 | Ranney | Mar. 2, 1920 |
| 2,095,931 | Kraft | Oct. 20, 1937 |
| 2,727,554 | Westfall | Dec. 20, 1955 |
| 2,762,413 | Walter | Sept. 11, 1956 |
| 2,804,792 | Westfall | Sept. 3, 1957 |
| 2,828,657 | Fromberg | Apr. 1, 1958 |